Figure 1:
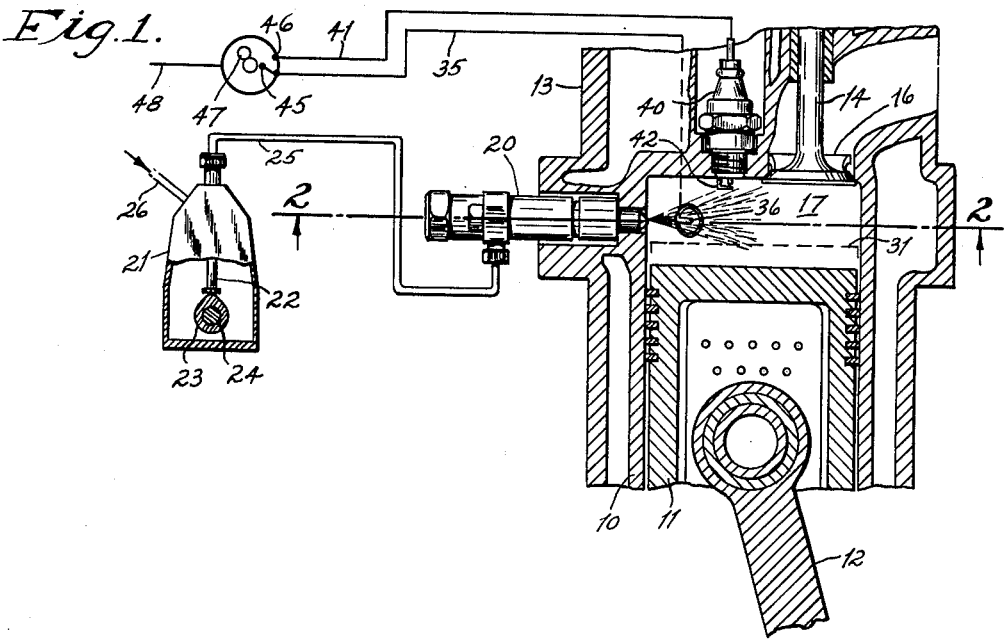

May 6, 1952 E. M. BARBER 2,595,914
INTERNAL-COMBUSTION ENGINE
Filed Nov. 20, 1946

INVENTOR.
EVERETT M. BARBER
BY
Daniel Stryker
ATTORNEY

Patented May 6, 1952

2,595,914

UNITED STATES PATENT OFFICE 2,595,914

INTERNAL-COMBUSTION ENGINE

Everett M. Barber, Wappingers Falls, N. Y., assignor to The Texas Company, New York, N. Y., a corporation of Delaware Application November 29, 1946, Serial No. 711,075

5 Claims. (Cl. 123—32)

This invention relates to a fuel-injection spark-ignition internal combustion engine, wherein the combustion phase is independent of the spontaneous ignition quality of the fuel employed, and knocking of the engine is prevented.

In my copending application, Serial No. 10,598 filed February 25, 1948, now Patent No. 2,484,009 dated October 11, 1949, and which is a continuation-in-part of Serial No. 513,232, filed December 7, 1943, now abandoned, there is disclosed and claimed an engine of this character wherein fuel is injected into rapidly swirling compressed air in the cylinder combustion space toward the latter part of the compression stroke, the first increment of injected fuel is spark-ignited substantially as soon as combustible fuel vapor-air mixture is formed therefrom to establish a flame front traveling counter to the direction of the air swirl, and the injection of fuel is continued into the swirling compressed air immediately in advance of the traveling flame front to progressively form additional combustible fuel vapor-air mixtures which are ignited by the traveling flame front and burned substantially as rapidly as formed. In a specific embodiment disclosed and claimed therein, fuel is injected tangentially into the combustion space in the direction of air swirl, and spark ignition of the first increment of injected fuel is secured by a spark plug mounted adjacent the injection nozzle and close to the periphery of the combustion space so as to be positioned at an edge of the spray form and in the region of diffusing fuel vapor-air mixture first produced therefrom.

The present invention is distinguished by the provision of dual spark ignition of the first increment of combustible fuel vapor-air mixture, wherein the dual spark igniters are arranged in coordinated spaced relationship with respect to a flaring fuel jet to secure more rapid formation of the flame front across one side of the combustion space. This coordinated relationship involves spark igniters substantially spaced from each other across the spray form on one side of the combustion space, so that one igniter is closer to the periphery of the combustion space while the other igniter is closer to the center of the combustion space. At the same time, both points of spark-ignition lie closely adjacent the outer edge of the spray form so as to lie outside the direct path of liquid particles of the spray, but within the region of diffused fuel vapor-air mixture which is formed substantially as soon as injection occurs. Both igniters are actuated in the cycle so as to substantially simultaneously initiate ignition at said spaced locations of the combustible mixture zone, whereby the resultant flames move rapidly toward each other and merge to thereby quickly establish a single continuous flame front across the path of the swirling air immediately after the start of injection.

Dual spark-ignition of an Otto cycle engine operating with preformed fuel mixture, and with the combustion space filled or substantially filled with the combustible fuel vapor-air mixture at the time of spark-ignition, has heretofore been utilized in order to insure ignition and combustion on each cycle. In such case, the relative positioning of the dual igniters is not critical, so long as the igniters are arranged with their electrodes within the combustible mixture present in the combustion space at the time of ignition. The present invention is distinguished by the fact that ignition occurs immediately after the start of fuel injection, thus requiring a critical relationship of the dual igniters with respect to the spray form in order to accomplish the new result of more quickly establishing the traveling flame front while injection is being continued.

In the engine of my mentioned prior application, proper location of a single igniting source with respect to the spray form will adequately insure ignition and combustion on each cycle. Consequently, the problem sought to be solved by the dual ignition systems of the prior art is not present, or is not so acute as to make the more expensive dual ignition economically justified from the standpoint of insuring ignition. However, particularly in large diameter cylinders where the flame has to travel from a point of ignition across a substantial distance of rapidly swirling compressed mixture, it will be appreciated that a substantial mass of injected fuel on the far side of the spray form from the ignition source may be swept by the swirling air beyond the locus of the flame front before that flame front can be produced.

It is accordingly a principal object of the present invention to provide a non-knocking engine of the general character disclosed in my mentioned application, wherein dual spark-ignition sources are critically coordinated with the spray form so as to more rapidly establish the traveling flame front across the path of the air swirl promptly after the start of fuel injection.

Other objects and advantages of the present invention will be apparent from the following description when taken in conjunction with the attached drawing and appended claims.

Figure 2:
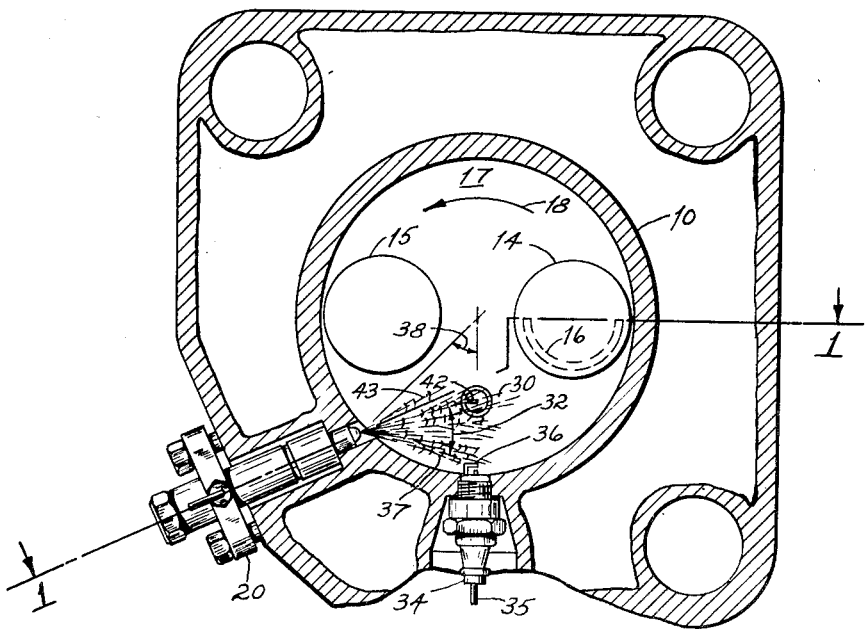

Referring to the drawing, which discloses a preferred embodiment of the invention:

Fig. 1 is a vertical sectional view of an engine cylinder taken on the plane of the line 1—1 of Fig. 2, with appurtenances illustrated diagrammatically and primarily in elevation; and Fig. 2 is a horizontal sectional view looking upwardly on the cylinder head and taken on the plane of line 2—2 of Fig. 1.

Referring to Fig. 1, the engine cylinder is indicated at 10 with piston 11 and connecting rod 12 which runs to the usual crank shaft, not shown. The cylinder head 13 is equipped with suitable ports controlled by an intake valve 14 and an exhaust valve 15. The intake valve 14 is provided with a customary shroud 16 which is set tangentially so that, on the suction stroke of piston 11, air is drawn into the disc-shaped combustion space 17 in a manner to impart a swirling movement of high velocity to this air within the combustion space, as indicated by the arrow 18 (Fig. 2). This high velocity air swirl is maintained during the compression stroke of piston 11.

Generally about 75 to 30° before top dead center, injection of fuel is initiated from injection nozzle 20 set tangentially of the combustion space in the direction of air swirl. Fuel injection is controlled by the usual fuel pump 21 having a plunger 22 operated by cam 23 on a cam shaft 24 which is driven in synchronism with the engine at ½ engine speed for four-cycle operation in conventional manner. It will be understood that fuel pump 21 controls the time and duration of injection by supplying the fuel under high pressure to injection line 25 leading to nozzle 20 during the pumping stroke of plunger 22, the latter controlling communication of a feed port supplied with fuel from line 26 leading from a suitable source of supply (not shown), with either a discharge port communicating with line 25 or a spill port (not shown) which returns the fuel to the source of supply. It will be further understood that the nozzle 20 is equipped with a suitable pintle or other type of spring-pressed valve which is opened for fuel injection by the high pressure of fuel supply in line 25 during the pumping stroke of plunger 22, and is immediately closed by spring pressure when plunger 22 uncovers the spill port which causes a drop in pressure in injection line 25.

In accordance with the present invention, the nozzle 20 is preferably of a well-known type producing a cone-shaped jet or spray form indicated at 30 which is located closer to the periphery at one side of the combustion space 17. The outer side of the cone-shaped jet extends along a chord of the combustion space closely adjacent the cylinder wall, while the inner or upstream side of the cone-shaped jet is substantially spaced from the center of the combustion space, as shown in Fig. 2. Nozzle 20 is positioned somewhat below the lower side of cylinder head 13 and about an equal distance from the upper dead center position of the piston as indicated by the dotted line 31 in Fig. 1. The penetration of the jet is insufficient to cause any substantial impingement of liquid fuel on the cylinder wall and head. A nozzle producing a 20 to 45° cone angle spray, as indicated by the arrow 32 in Fig. 2, is satisfactory, it being understood that the smaller cone angles with jets of higher penetration are employed for the larger diameter cylinders, while the higher cone angles within that range with jets of lower penetration are utilized for smaller diameter cylinders. While very satisfactory results have been secured with nozzles producing cone-shaped jets, it is to be understood that other well-known types of nozzles, such as those producing flattened fan-shaped jets, can be used, so long as the spray form flares across a substantial portion of the path of the swirling air on one side of the combustion space as shown in Fig. 2. The swirling air spreads or strips the fuel spray to form a fuel cloud with only a short travel from the nozzle, so that the swirling air becomes substantially uniformly impregnated across a radius of the combustion space.

As shown particularly in Fig. 2, a spark plug 34 having electrical lead 35 is mounted in the side wall of cylinder 10 so that the electrodes 36 are closely adjacent the edge of the spray form and lie within the region of diffused fuel vapor-air mixture indicated at 37 substantially as soon as that mixture is formed upon initiation of fuel injection. The angle formed by radii passing respectively through the locus of fuel injection from nozzle 20 and the spark plug 34, as indicated by the arrow 38 in Fig. 2, is generally within the range of 20 to 75°, with 30 to 60° being preferred.

Also mounted in cylinder head 13 is a second spark plug 40 having electrical lead 41. As shown in Fig. 2, plug 40 is positioned with its electrodes 42 close to or substantially on the vertical plane of the radius passing through plug 34, and somewhat more than half the distance across the spray form from electrodes 36. As shown in Fig. 1, the electrodes 42 of plug 40 are arranged above the horizontal plane of nozzle 20 and plug 34, being preferably slightly below the lower surface of cylinder head 13. The position of electrodes 42 is such that they are within the region of diffused fuel vapor-air mixture indicated at 43, which is picked up by the swirling air from the upper surface of the jet in advance of the said electrodes and carried into contact with the plug electrodes. In this manner, both electrodes are maintained on the down-stream side of different portions of the spray form, so that diffusion is aided by the swirling air in providing ignitible contact of the combustible mixture with both plug electrodes promptly after the start of fuel injection.

As shown diagrammatically in Fig. 1, leads 35 and 41 are respectively connected to contacts 45 and 46, which are simultaneously contacted by a suitable rotary distributor 47 driven in synchronism with the engine. It will be understood that the distributor is part of a conventional ignition system including lead 48, whereby the timing of spark ignition can be correlated and synchronized with the timing of fuel injection on each cycle. In the particular arrangement shown, sparks of igniting intensity are present at electrodes 36 and 42 approximately four to ten crank-angle degrees following the start of fuel injection, at which time combustible fuel vapor-air mixture from the first increment of injected fuel reaches the electrodes. It will be noted that electrodes 42 are roughly about half the distance from the center of the combustion space to the periphery along the radius passing through plug 34. However, it will be appreciated that this distance will vary, depending on the position and shape of the jet and the angle 38; but in any event, the electrodes 42 will always be substantially spaced from the center of the combustion space. In this manner, the electrodes 42 are conveniently positioned more than half way across the spray form from electrodes 36, as viewed in Fig. 2, and still are in the path of the combustible mixture being spread or stripped by the swirling air from the upper edge of the spray.

It should be explained that, with conventional injection systems, the spark discharge at the plug electrodes continues for about four to fifteen crank-angle degrees after it has been initiated. A substantial portion of this spark discharge is of igniting intensity. Consequently, this reduces somewhat the criticality of the actual spark timing with respect to the injection advance, as well as the necessity for initiating the spark discharge at both plugs at the same point in the cycle. Due to this so-called spark tolerance, one or both plugs may be set to initiate the spark discharge substantially at the time in the cycle of initiating fuel injection, or shortly before that time, or shortly thereafter. The important thing is to have sparks of igniting intensity present at both electrodes at the time the combustible fuel vapor-air mixture from the first increment of injected fuel reaches the said electrodes.

While the particular arrangement shown, including the electrodes of one plug positioned at the periphery of the combustion space at the side of the spray form, and the electrodes of the second plug positioned slightly below the cylinder head at the upper side of the spray form toward the center of the combustion space, constitutes a preferred arrangement, it will be understood that this positioning of the dual ignition sources with respect to the flaring jet may be altered somewhat. Thus, with the cone-shaped jet illustrated, the electrode 40, mounted in the cylinder head, may be positioned closer to the center of the combustion space, provided the mounting is such that the electrodes 42 extend downwardly into the combustion space a substantial distance below the cylinder head so as to lie at the inner side of the fuel spray. The two sets of electrodes are arranged substantially in line along a radius of the combustion space, since that is substantially the normal position of the flame front during combustion. Therefore, the two flames initiated by the dual ignition sources are enabled to move toward each other and merge in substantially the zone occupied by the flame front during combustion, which insures the maximum rate of formation of the flame front on each cycle. In the case of either the cone-shaped spray or the flatened fan-shaped spray, both spark plugs can be mounted in the cylinder head with the electrodes of one plug on the side of the center line of the fuel spray adjacent the periphery of the combustion space, and the electrodes of the other plug on the side of said center line toward the center of the combustion space.

By way of example of an engine constructed in accordance with the present invention which has given very satisfactory operation, the following is mentioned:

A modified C. F. R. cylinder of 3¼ inch bore and 10:1 compression ratio was equipped with an injection nozzle having a 30° cone angle 32 at atmospheric pressure mounted tangentially through the cylinder wall approximately 13/32 of an inch below the cylinder head. A spark plug 34 was mounted on the same horizontal plane through the cylinder wall forty-five angular degrees from the locus of fuel injection, with its electrodes positioned substantially at the periphery of the combustion space. A second spark plug was mounted in the cylinder head on the vertical plane of the radius passing through plug 34 as shown in the horizontal view of Fig. 2, with the electrodes positioned substantially ¼ of an inch below the cylinder head and approximately 13/16 inch from the center axis of the combustion space. Substantially simultaneous ignition at spaced sides of the spray form was obtained, using an injection advance of 45° B. T. C. and a spark advance of 48 and 42° B. T. C. on spark plugs 40 and 34 respectively. The traveling flame front was almost instantly formed across the path of the swirling air between the spaced points of ignition, and knock-free operation was secured with 20 octane fuel at 10:1 compression ratio and various boost pressures.

Operation of the engine is thought clearly apparent from the foregoing description. On the suction stroke of piston 11, air is drawn into the combustion space 17 through intake valve 14, with the shroud 16 directing the air in a tangential flow to set up a high velocity air swirl indicated by the arrow 18. This air is compressed on the compression stroke of piston 11. During the latter part of the compression stroke, initiation of fuel injection occurs from nozzle 20 tagentially of the combustion space and in the direction of air swirl. Shortly after the start of fuel injection, simultaneous sparks are produced at the spaced electrodes 36 and 42 on spaced sides of the spray form 30 to ignite fuel vapor-air mixture diffused from the first increment of injected fuel to thereby simultaneously produce two flames which rapidly move across the spray form and join to establish the single continuous flame front. Thereafter, fuel injection is continued into fresh swirling compressed air immediately in advance of this flame front, so that additional fuel vapor-air mixtures are progressively formed and ignited by the flame front and thereby burned substantially as rapidly as formed. The result is that the combustion phase is initiated without danger of by-passing fuel around the initial flame, and resulting combustible fuel mixture is consumed throughout the entire combustion period substantially as rapidly as it is formed, whereby knocking of the engine cannot occur. Following the completion of combustion and the resulting power stroke of piston 11, exhaust valve 15 opens for the exhaust of products of combustion, and the cycle is then repeated.

While the present invention has been particularly illustrated in connection with tangential fuel injection in the direction of air swirl, it is to be understood that the invention is also applicable to injection across or against the air swirl, with the spaced points of ignition being correlated with spaced sides of the spray form in the manner illustrated.

Obviously many modifications and variations of the invention as hereinbefore set forth, may be made without departing from the spirit and scope thereof, and therefore only such limitations should be imposed as are indicated in the appended claims.

I claim:

1. In the operation of an internal combustion engine, wherein fuel is injected into rapidly swirling compressed air at one side of a diameter of the cylinder combustion space toward the latter part of the compression stroke, the first increment of injected fuel is spark-ignited substantially as soon as combustible fuel vapor-air mixture is formed therefrom to establish a flame front across said one side of the combustion space and traveling counter to the direction of air swirl, and the injection of fuel is continued into the swirling compressed air at said one side of the combustion space immediately in advance of the traveling flame front to progressively form additional combustible fuel vapor-air mixtures which are ignited by the traveling flame front and burned substantially as rapidly as formed; the improvement which comprises injecting the fuel in a flaring jet on said one side of the cylinder combustion space, and substantially simultaneously spark igniting the first increment of injected fuel at points substantially spaced from each other across said flaring jet at said one side of the combustion space, one of said points being closer to the periphery of the combustion space and the other point being closer to the center thereof but spaced therefrom, and both of said points being closely adjacent the outer edge of the spray-form so as to lie within the region of diffused fuel vapor-air mixture substantially as soon as formed, to thereby initiate two regions of flame which merge to rapidly establish a single continuous flame front across the path of the swirling air at said one side of combustion space at the beginning of the injection period on each cycle, thereby preventing any substantial amount of the first increment of injected fuel from being swept by the swirling air beyond the locus of the flame front before the said flame front is established.

2. The method according to claim 1, wherein the fuel is injected tangentially of the combustion space in the direction of air swirl, one point of spark-ignition being closely adjacent the periphery of the combustion space on the air down-stream side of the locus of fuel injection, and the other point of spark-ignition lying substantially on a radius of the combustion space containing said first point and spaced from the center of the combustion space.

3. In an internal combustion engine having a power cylinder and cylinder head with piston operating therein providing a disc-shaped combustion space, air intake means for said cylinder adapted to introduce air into said combustion space and impart a high velocity of swirling movement therein, a fuel injection nozzle mounted to inject an atomized flaring fuel spray into one side of a diameter of said combustion space in a manner to avoid direct impingement of liquid fuel particles on said cylinder wall and head, and means synchronized with engine operation for supplying fuel to said nozzle toward the latter part of the compression stroke of said piston at a temperature and pressure such that at least a portion of the first increment of injected fuel vaporizes rapidly and forms with a localized portion of the swirling air a combustible fuel vapor-air mixture with only a short travel of the fuel from the nozzle; the improvement which comprises spaced spark plugs mounted on said cylinder and cylinder head with their electrodes near said nozzle but substantially spaced from each other across said fuel spray at said one side of said combustion space, both of said plug electrodes being immediately adjacent the edge of the spray form so as to be out of the direct path of the spray but within the region of diffused fuel vapor-air mixture from the first increment of injected fuel of said spray, the electrodes of one plug lying closer to the periphery of the combustion space while the electrodes of the other plug lie closer to the center of the combustion space but substantially spaced therefrom, and means synchronized with engine operation for substantially simultaneously creating sparks of igniting intensity at both of said electrodes promptly after the start of fuel injection and at the time fuel vapor-air mixture from the first increment of injected fuel is in contact with both of said electrodes, to thereby produce two localized flames which rapidly move toward each other and merge to establish a single continuous flame front across the path of the swirl at said one side of said combustion space at the beginning of the injection period on each cycle, thereby preventing any substantial amount of the first increment of injected fuel from being swept by the swirling air beyond the locus of the flame front before the said flame front is established.

4. An internal combustion engine according to claim 3, wherein said fuel injection nozzle is mounted in the cylinder wall, one of said plugs is also mounted in the cylinder wall with its electrodes closely adjacent the periphery of the combustion space and approximately in the same horizontal plane as said nozzle, and the other plug is mounted in said cylinder head with its electrodes in a horizontal plane above the said horizontal plane of said nozzle.

5. An internal combustion engine according to claim 3, wherein said fuel injection nozzle is mounted in the cylinder wall tangentially of the combustion space and directed in the direction of air swirl, one of said plugs is also mounted in the cylinder wall with its electrodes closely adjacent the periphery of the combustion space and spaced about 20–60 angular degrees around the cylinder on the air down-stream side from said nozzle, and the other plug is mounted in said cylinder head with its electrodes lying substantially in a vertical plane passing through said first mentioned electrodes and the center of the combustion space.

EVERETT M. BARBER.

REFERENCES CITED

The following references are of record in the file of this patent:

UNITED STATES PATENTS

| Number | Name | Date |
|---|---|---|
| 1,235,725 | Power | Aug. 7, 1917 |
| 2,086,427 | Mock | July 6, 1937 |
| 2,142,280 | Mock | Jan. 3, 1939 |
| 2,481,890 | Toews | Sept. 13, 1949 |
| 2,484,009 | Barber | Oct. 11, 1949 |

FOREIGN PATENTS

| Number | Country | Date |
|---|---|---|
| 525,067 | Great Britain | Aug. 21, 1940 |

OTHER REFERENCES

Ser. No. 332,506, Nallinger et al. (A. P. C.), published May 11, 1943.

S. A. E. Journal (Transactions), August 1936 (pages 297–303), (volume 39, No. 2).

S. A. E. Journal (Transactions), January 1947 (pages 98–104, 115, 142 and 143) (volume 1, No. 1).